Nov. 13, 1928.
S. SACHS
NOZZLE
Original Filed May 11, 1927
1,691,498
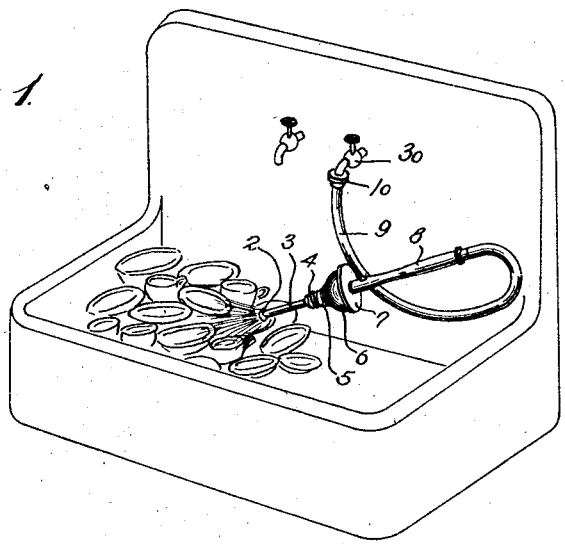
Fig. 1.
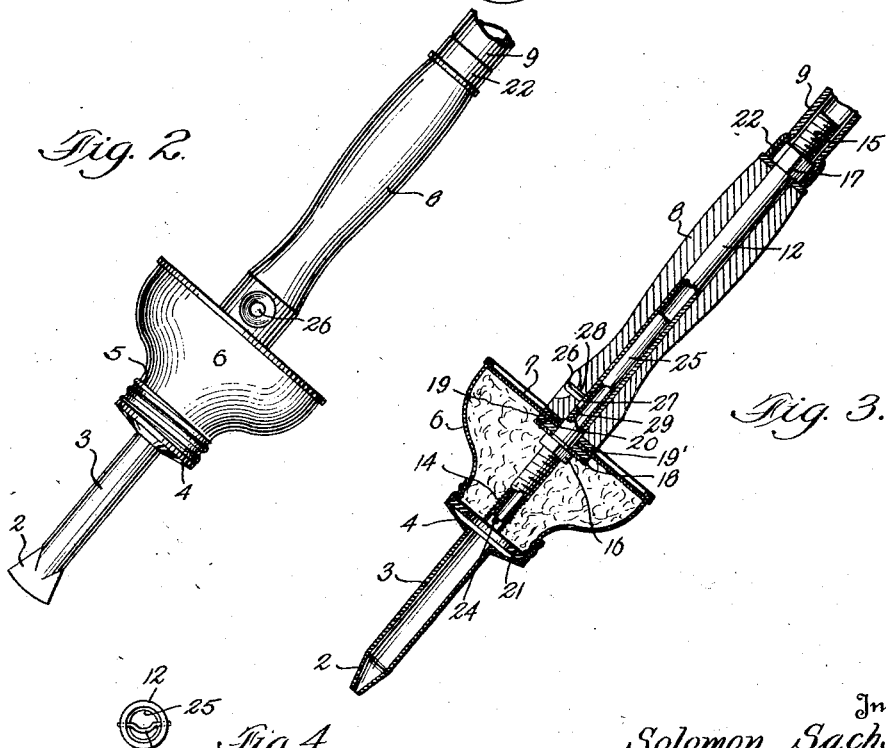
Fig. 2.
Fig. 3.
Fig. 4.
Inventor
Solomon Sachs.
By
Attorney Patented Nov. 13, 1928.

1,691,498

UNITED STATES PATENT OFFICE.

SOLOMON SACHS, OF WASHINGTON, DISTRICT OF COLUMBIA, ASSIGNOR, BY MESNE ASSIGNMENTS, TO UTILITIES CORPORATION OF MARYLAND, OF WASHINGTON, DISTRICT OF COLUMBIA, A CORPORATION OF MARYLAND.

NOZZLE.

Application filed May 11, 1927, Serial No. 190,473. Renewed September 26, 1928

An important object of this invention is the provision of a nozzle for discharging a sharp or cutting stream of water or other liquid against dishes, or other object to be cleaned or otherwise treated, and at the same time to saturate the liquid with soap or other material, such as a chemical.

Another object is to construct such a device in a manner to avoid leaking thereof, without having to resort to complex or expensive methods of sealing the joints against undesirable discharge through such joints of scalding or chemically treated liquids.

And a further object is to provide such a device with means for restricting the flow of liquid therethrough without resorting to the use of any complicated or expensive valve structures.

With these and other objects in view, reference will be had to the accompanying drawing, in which Fig. 1 is a perspective view of the invention as applied, Fig. 2 is a view in side elevation of the invention, Fig. 3 is a vertical longitudinal sectional view therethrough.

Fig. 4 is an end view of the pipe projecting into the nozzle, looking toward the handle.

In the drawing, reference numeral 2 designates a flattened outlet end of a tubular metal nozzle 3, suitably affixed to a screw cap 4 of metal and threaded onto the screw neck 5 of a metal receptacle 6 which may contain soap or chemical for saturating the water. The receptacle is provided centrally of its bottom 7 with a handle 8 of wood or other heat insulating material, and having secured to its outer end a rubber or other flexible hose 9 adapted to be attached to a house faucet by means of a well known attachment 10. The handle 8 is provided with a central bore receiving a pipe 12 of metal and having its opposite ends 14 and 15 screw threaded to receive nuts 16 and 17. One or the other of these need not be threaded onto the pipe 12, but may be rigidly attached thereto or a part thereof. A metal washer 18 is placed beneath and the receptacle bottom 7 is clamped between this and an elastic packing ring or gasket 19, the receptacle bottom being perforated as at 20 to receive the pipe 12. By this construction, when the nuts 16 and 17 are moved toward each other relatively, the assembled parts 18, 7, 19, and 8 are firmly pressed together and the resultant compression of the gasket 19 seals the device against leakage of liquid where the handle joins the receptacle, and since a gasket 21 between the cap 4 and neck 5 seal against leakage at that point, there will be no annoyance from leakage at any point. The hose is attached by placing its end over the pipe end 15 so that the threads of such end will imbed themselves in said hose 9 and the joint is made further leak proof by means of a ferrule or other clamp 22.

The outlet end of pipe 12 is provided with a cross pin 24, which is encountered by the liquid, causing the latter to spread, some against the side wall of the receptacle and some entering directly into the aligned nozzle 3. The portion striking the side wall of the receptacle mixes with the soap or chemical within the receptacle and taking up some of the same finds its way out of the nozzle 3 with the main supply of liquid.

Within the bore of the pipe 12 is inserted a rubber or other flexible and compressible tube 25, the same fitting or bearing at one end against the cross pin 25 and being prevented thereby from working out of the pipe 12 due to the force of the liquid. If desired, this tube 25 may be cemented in place against the interior wall of the pipe 12, but this is not necessary since the expansible force of the water will press the rubber tube 25 against the inner wall of the pipe 12 rendering the joint between them liquid or leak proof. At a convenient point easily reached by a finger of the user's hand, while holding the handle, is located a means for compressing the tube 25, such means consisting of a press button 26 having an enlarged head 27 and arranged within registering openings 28, 29, in the pipe and handle respectively, there being a countersink 29 to receive the user's finger in depressing the button 26. Any well known means may be substituted for compressing the tube 25, such as the various means commonly employed for compressing ink bags in fountain pens.

In use, the attachment 10 is affixed to a faucet, and the valve 30 turned to permit flow of the liquid, and in passing through the hose 9 and pipe 12 to the interior of the receptacle, takes up the soap or chemical therein and discharges through nozzle 3 in a flattened cutting stream capable of removing food remains or dirt from dishes or other surfaces. The valve 30 alone is employed for cutting off the flow of liquid entirely, but when it is desired to restrict the flow, the button 26 is depressed to compress the tube 25 a desired amount thereby restricting the area of the liquid passage therethrough.

The thrust of the tube 25 endways in one direction is taken by the pin 24, relieving the cement, when used between the tube 25 and pipe 12 of any great strain, and when no cement is used, preventing the tube 25 from blowing out under pressure of the liquid. If the tube 25 becomes displaced rearwardly, the liquid pressure will force it to normal position against the pin where it will be in position for compression by the press button 26.

What is claimed:—

1. In a device of the character described, a nozzle, a rigid tube extending through the nozzle, a pin arranged across the interior of the outlet end of the tube, a flexible hose within the tube and abutting against said pin, said pin preventing water passing through the hose from driving the latter out of the tube, a handle surrounding the tube and arranged exteriorly of the nozzle, said hose extending into the portion of the tube which is surrounded by the handle, means extending through the tube and handle and engaging the hose for use in compressing the latter, and a supply hose connected to said tube.

2. In a device of the character described, a nozzle having an apertured end, a rigid tube extending through the aperture in the end of the nozzle, means surrounding the tube where it passes through said aperture for packing the joint at this point, a flexible hose within the tube, a handle surrounding the tube and arranged exteriorly of the nozzle, said hose extending into the portion of the tube which is surrounded by the handle and means for compressing the hose within the handle.

3. In a device of the character described, a nozzle having an apertured end, a rigid tube extending through the aperture in the end of the nozzle, packing washers arranged on the tube at opposite sides of the apertured end of the nozzle, a handle surrounding the tube, rigidly connected to the latter, and having a shoulder forming an abutment for one of said packing washers, a supply hose, means arranged exteriorly of the handle for connecting the supply hose to the tube, and means including a compressible hose arranged within the portion of the tube surrounded by the handle for varying the volume of liquid flowing through the tube.

4. In combination, a nozzle having an apertured end, a rigid tube extending through the aperture in the end of the nozzle and having threads arranged within the nozzle, a handle through which the tube extends, means at the outlet end of the handle for limiting the movement thereof in one direction on the tube, a packing washer arranged on the tube between the handle and the apertured end of the nozzle, another packing washer on the tube and abutting the inner surface of the apertured end of the nozzle, a nut engaging the threads of the tube for securing the handle to the nozzle and for compressing the packing, a pin extending across the interior of the outlet end of the tube, a flexible hose within the tube and abutting against said pin for preventing the hose from being driven out of the tube by water flowing through the latter, said hose extending into the portion of the tube surrounded by the handle and means for compressing said hose within the handle, said last mentioned means having a part projecting through the handle.

In testimony whereof I affix my signature.

SOLOMON SACHS.